United States Patent [19]
Djabbarah

[11] Patent Number: 5,325,920
[45] Date of Patent: Jul. 5, 1994

[54] ENHANCED OIL RECOVERY FROM LOW PERMEABILITY RESERVOIRS USING ORGANOSILICONE SURFACTANTS

[75] Inventor: Nizar F. Djabbarah, Richardson, Tex.

[73] Assignee: Mobil Oil Corp., Fairfax, Va.

[21] Appl. No.: 992,675

[22] Filed: Dec. 18, 1992

[51] Int. Cl.$^5$ .............................................. E21B 43/22
[52] U.S. Cl. ...................... 166/272; 166/303; 166/309; 292/8.554
[58] Field of Search ............... 166/270, 272, 294, 303, 166/309; 252/8.554

[56] References Cited

U.S. PATENT DOCUMENTS

| | | |
|---|---|---|
| 2,881,838 | 4/1959 | Morse et al. . |
| 2,970,150 | 1/1961 | Bailey . |
| 3,120,266 | 2/1964 | Martin et al. ..................... 166/309 |
| 3,155,160 | 11/1964 | Craig, Jr. et al. . |
| 3,259,186 | 7/1966 | Dietz . |
| 3,412,793 | 11/1968 | Needham ..................... 166/272 X |
| 3,618,666 | 11/1971 | Sayers ........................ 166/272 X |
| 4,086,964 | 5/1978 | Dilgren et al. ................. 166/272 |
| 4,301,868 | 11/1981 | Scherubel et al. ............ 166/309 X |
| 4,796,702 | 1/1989 | Scherubel ..................... 166/309 X |

Primary Examiner—George A. Suchfield
Attorney, Agent, or Firm—Alexander J. McKillop; George W. Hager, Jr.; Charles A. Malone

[57] ABSTRACT

A method for enhanced oil recovery in a reservoir having a substantial silicon content where an organosilicone surfactant is co-injected with steam to generate a foam. The organosilicone surfactant component of the foam prevents a dissolution of the silicon-containing formation since local equilibrium is assured. Prevention of formation dissolution reduces caving near the wellbore and minimizes permeability reduction away from the wellbore.

21 Claims, 2 Drawing Sheets

ENHANCED OIL RECOVERY FROM LOW PERMEABILITY RESERVOIRS USING ORGANOSILICONE SURFACTANTS

FIELD OF THE INVENTION

This invention relates to a steam drive process for producing oil or tar. More particularly, the invention provides a process for recovering oil from a subterranean oil reservoir, or at least a portion of such reservoir, in which stratification due to differences in permeabilities of the individual areas of rocks is not sufficient to cause a significant portion of an injected fluid to flow through only one or a few layers of relatively higher permeability.

BACKGROUND OF THE INVENTION

In the recovery of oil from oil-containing formations, it is usually possible to recover only minor portions of the original oil in-place by the so called primary recovery methods which utilize only the natural forces present in the formation. Thus, a variety of supplemental recovery techniques have been employed in order to increase the recovery of oil from subterranean formations. These techniques include thermal recovery methods, e.g., steam-flooding, water flooding, carbon dioxide and miscible flooding.

In an oil reservoir, the rocks may be capable of exhibiting high vertical and horizontal absolute permeability, although the mobility (i.e., permeability divided by viscosity) of fluid within the reservoir may be low and/or in-homogenous due to variations in reservoir lithology and fluid distribution within some or all of the pore spaces. In such a relatively non-stratified reservoir, fluids tend to become segregated by density. When a stratification of mobility is encountered it is usually due to a distribution of the oil, for example, in a layer above the water-rich, or below a gas-rich, portion of the reservoir.

When steam is flowed through such a reservoir at a pressure less than the fracturing pressure, steam tends to form a finger or channel that overrides a significant portion of the reservoir due to gravity segregation. Such a channel usually rides or runs along the upper portion of the reservoir, due to the effects of gravity. However, where an oil-rich layer overrides a water-rich layer, a steam channel may run along the upper portion of the water layer, near its junction with the oil layer. As is known to those skilled in the art, in such reservoirs, a steam channel can be relatively quickly formed and extended between horizontally separated injection and production locations for example, by injecting steam at a pressure near or less than the fracturing pressure while producing fluids as rapidly as possible.

In addition to the problems of channeling, diatomaceous intervals of a formation present additional problems. As is known, diatomaceous intervals comprise soft bulky solid material (88% silica) that is composed of skeletons of small prehistoric aquatic plants related to algae (diatoms). This type of formation is characterized by high porosity and low permeability. Steam-flooding is the most viable method to be utilized, from the standpoint of varying oil composition and viscosity in such formations or reservoirs. However, the nature of the formation with the significant silicon content renders a steam-flooding operation ineffective. This occurs because silicon salts in the formation become more soluble in a liquid component of steam at high temperatures and pH's. Continued steam-flooding in such a formation results in a dissolution of the silicon salts which can lead to formation caving near the wellbore. Additionally, it may lead to considerable formation damage due to the migration of fine (small sized, less than 30 microns) sand particles resulting in further permeability reduction away from the wellbore.

Therefore, what is needed is a method of steam-flooding in a diatomaceous or siliceous formation which will not remove silicon salts and avoid caving near the wellbore and permeability reduction away from the wellbore.

SUMMARY OF THE INVENTION

In the practice of this invention, an organosilicone surfactant is used to make a foam for use during a steam-flooding operation. The foam can be generated during the steam-flooding operation or it can be made ex-situ and be injected subsequently into the formation along with the steam via an injection well. In one embodiment, the surfactant is co-injected with steam or with steam and a noncondensible gas, such as nitrogen in order to generate a foam. Organosilicone surfactant in the liquid component of the foam prevents dissolution of the silicon-containing formation because silica dissolution is inhibited by the existence of local equilibrium between dissolved silica and the silica in solution. Also, maximum solid-liquid contact is ensured because of a large surface-to-volume ratio associated with foam. Moreover, foam's high viscosity and its gas-like density maintain good flow distribution thereby reducing the tendency of steam to override.

It is therefore an object of this invention to increase steam's vertical sweep efficiency during a steam-flooding operation by using a pre-formed or co-injected organosilicone surfactant foam wherein said foam is placed into a gravity override zone.

It is another object of this invention to inject a pre-formed or co-injected organosilicone surfactant foam into the gravity override zone so as to obtain a greater gas flow diversion than can be accomplished by injecting steam alone into the bottom of a vertical injection well while minimizing silicon dissolution in a diatomaceous interval of a formation.

It is a still yet further object of this invention to prevent near wellbore caving and permeability reduction in a diatomaceous interval by utilization of an organosilicone surfactant foam in conjunction with a steam-flooding operation.

It is a yet still further object of this invention to obtain increased yields of hydrocarbonaceous fluids by injecting an organosilicone surfactant foam into a diatomaceous interval during a steam-flooding operation.

DESCRIPTION OF THE PREFERRED EMBODIMENTS

Figure 1:
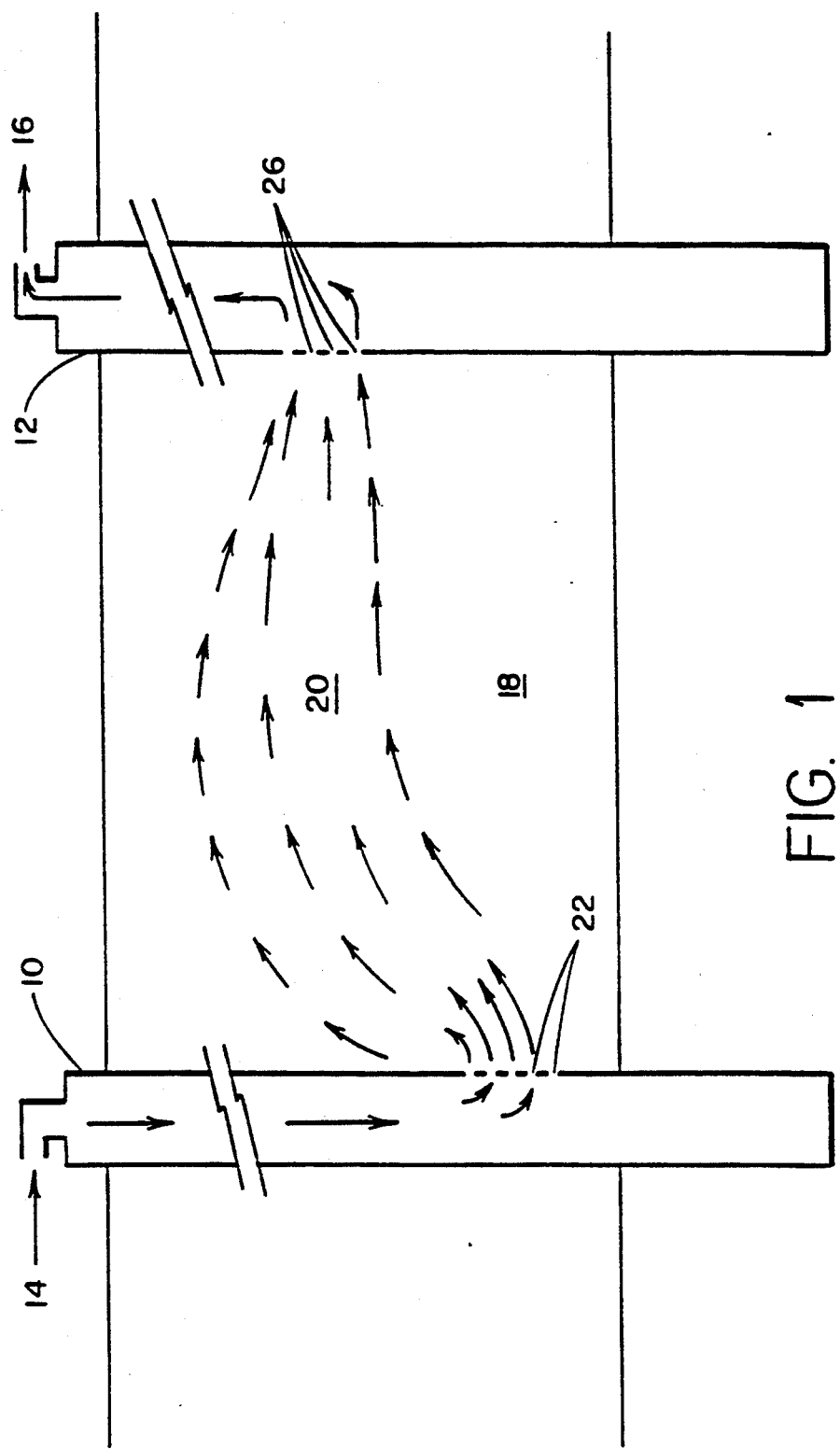
FIG. 1 is a diagrammatic plan view of a formation wherein steam has passed through a high permeability zone or area into a production well.

During the recovery of hydrocarbonaceous fluids from a formation wherein a steam-flooding process is utilized, as is shown in FIG. 1, steam enters conduit 14 of injection well 10. Afterwards, steam exits injection well 10 via perforations 22 and enters permeability zone 20. Steam and hydrocarbons obtained from high permeability zone 20 exit through production well 12 via perforations 26. Thereafter, steam and hydrocarbonaceous fluids exit production well 12 via conduit 16. During this steam-flooding process, the formation is heated up by the steam. While being heated, steam by-passes some areas of the formation. Thus, "thief" zones and zones swept by override steam are created.

Development of these zones can occur where steam is utilized with a single well or where multiple wells are used. When steam is used in a single well for hydrocarbonaceous fluid production, the technique is known as a "huff and puff" method. This method is described in U.S. Pat. No. 3,259,186 which is hereby incorporated by reference herein. In this method, steam is injected via a well in quantities sufficient to heat the subterranean hydrocarbon-bearing formation in the vicinity of the well. The well is then shut-in for a soaking period, after which it is placed on production. After production has declined, The "huff and puff" method may again be employed on the same well to again stimulate production.

The application of single well schemes employing steam injection as applied to heavy oils or bitumen is described in U.S. Pat. No. 2,881,838, which utilizes gravity drainage. This patent is incorporated by reference herein, An improvement of this method is described in a later patent, U.S. Pat. No. 3,155,160, in which steam is injected and appropriately timed while pressuring and depressurizing steps are employed. Where applicable to a field pattern, the "huff and puff" technique may be phased so that numerous wells are on an injection cycle while others are on a production cycle; the cycles may then be reversed. This patent is hereby incorporated by reference herein.

U.S. Pat. No. 4,257,560 describes a method for recovering high viscosity oils from subsurface formations using steam and an inert gas to pressurize and heat the formation along with the oil it contains. Steam and the inert gas may be injected either simultaneously or sequentially, e.g. steam injection, followed by a soak period, followed by injection of inert gas. Inert gases referred to include helium, methane, carbon dioxide, flue gas, stack gas and other gases which are noncondensible in character and which do not interact either with the formation matrix or the oil or other earth materials contained in the matrix. This patent is hereby incorporated by reference herein.

When it becomes uneconomical to continue injecting steam to recover hydrocarbonaceous fluids via a "huff and puff" method or from a heated high permeability zone where steam-flooding is employed as shown in FIG. 1, steam injection into injection well 10 is ceased. Eventually, steam and hydrocarbonaceous fluids cease to flow into producer well 12. While steam is proceeding through a high permeability zone or interval of a diatomaceous formation or interval containing substantial amounts of silica, silicon salts are solubilized. As is known to those skilled in the art, these salts are solubilized and removed because of the high temperatures and low pH's generated during a steam-flood. At a temperature of 100° C., for example, as much as 300 ppm of silicon dioxide and 75 ppm of quartz may be solubilized. At pH's of 8 or less, 120 ppm and 10 ppm of quartz may be solubilized. To prevent near wellbore caving and permeability reduction caused by such solubilization during a steam flood, an organosilicone surfactant can be used with a noncondensible gas to generate a foam while steam-flooding as above mentioned in a high permeability zone or diatomaceous interval of the formation.

Injection of the organosilicone surfactant into the liquid component of the foam retards silica dissolution and prevents dissolution of the silicon-containing formation because the dissolved silica ensures local equilibrium in a formation and prevents further dissolution of the formation's silica. Local equilibrium is based on the concept that no additional solid will dissolve if that solid contacts a liquid solution that is saturated with it. For example at 400° F. and a pH of 8, the solubility of amorphous silica in a California steam generator liquid is 0.05 wt. %.

If a solution saturated with 0.05 wt. % silica is injected in the formation no additional silica will dissolve because the solution is already saturated with the solid at local injection conditions and therefore the liquid is in local equilibrium with the sand. Additionally, maximum solid-liquid contact is ensured because of a large surface-to-volume ratio associated with the foam. Moreover, the high viscosity of foam and its gas-like density maintains good flow distribution while reducing the tendency of the steam to override a desired zone or interval where steam injection is desired.

One type of organosilicone surfactant that can be utilized is a nonionic silicone glycol copolymer such as the General Electric's Silicone series marketed by General Electric as Silicone "SF-1034 ®" nonionic silicone glycol copolymers. Another organosilicone surfactant which can be utilized is marketed by Union Carbide under the "SILWET L ®" trademark. "SILWET" surfactants comprise polyalkylene oxide block copolymers such as siloxane-oxyalkylene copolymers that are hydrolytically stable. This surfactant is disclosed in U.S. Pat. No. 2,970,150 which is hereby incorporated by reference herein. A brief description of these surfactants is given by I. R. Schmolka in an article entitled "Polyalkylene Oxide Block Copolymers" which appeared in the Surfactant Science Series, Vol. 1, pages 350–352, Nonionic Surfactants, edited by M. J. Schick that was published by Marcel Dekker in New York, N.Y. during 1966.

Another type of organosilicone surfactant is the sulfo-derivative of organosilicone maleates. The general formula and foaming properties thereof are discussed by Gol'din et al. in and article entitled "Surface and Foam-Forming Properties of Sulfo-Derivatives of Organosilicon Maleates", that appeared in the English Translation of Kelloidnyi Zhurnal, Vol. 50, No. 1, pages 115–117, Jan.–Feb., (1988).

Figure 2:
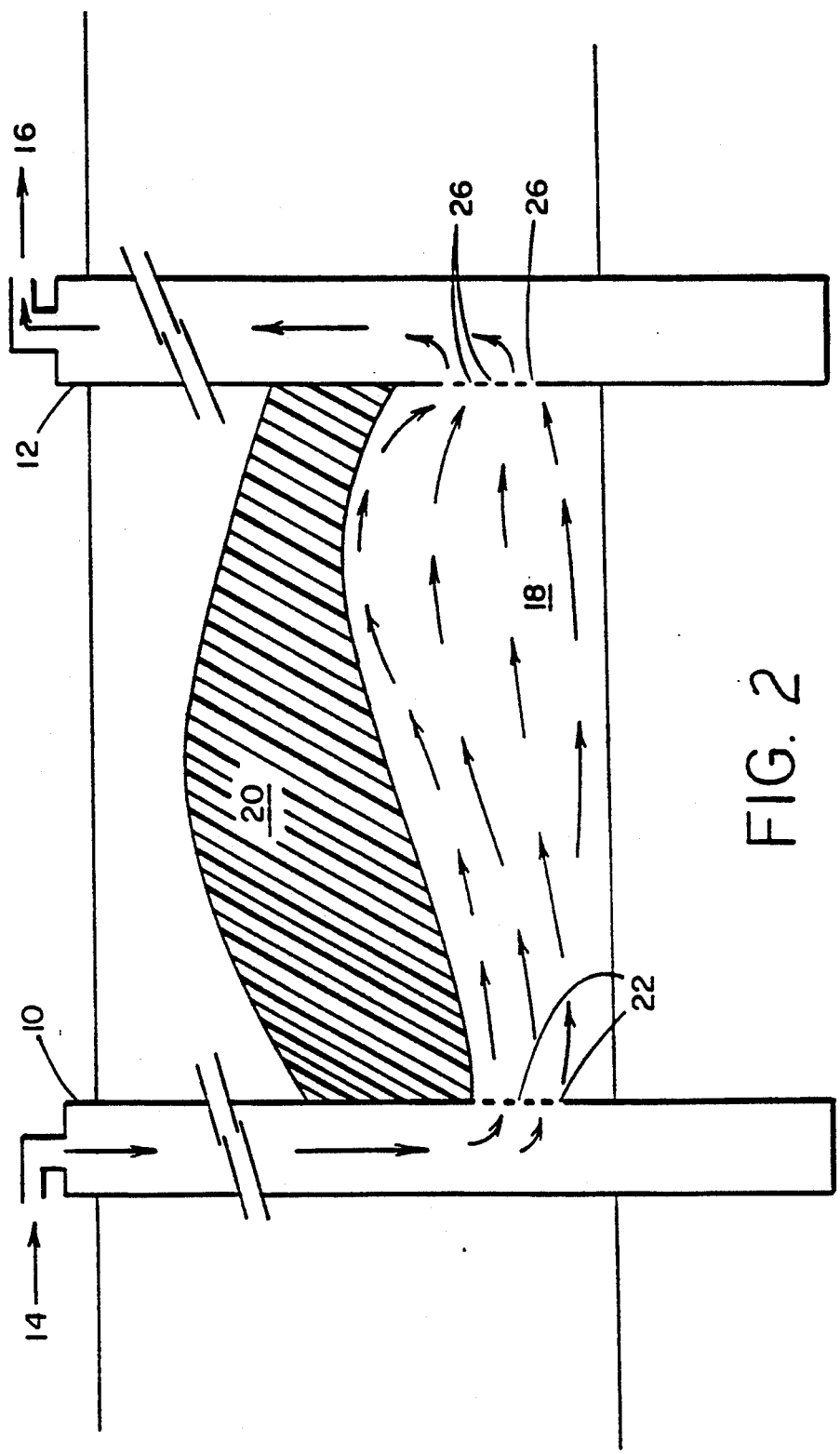
FIG. 2 is a diagrammatic plan view where a high permeability zone has been closed with an organosilicone surfactant foam while steam is passing through a low permeability zone or area.

These organosilicone surfactants can be used in a steam-flooding operation for either profile control or mobility control. Foam can be made from the surfactant either in-situ or ex-situ. When used in profile control to remove oil from an overridden zone as shown FIG. 2, the foam can be created by directing the surfactant and a noncondensible gas down injector well 10 via conduit 14 along with steam. Foam and steam enter higher permeability zone 20 via perforations 22. Initially, the created foam will enter high permeability zone 20 thereby blocking it off to fluid flow. After high permeability zone 20 has been blocked off, foam containing the surfactant enters lower permeability zone 18 along with the steam. Here the organosilicone surfactant in the liquid component of the foam prevents the dissolution of the silicon-containing zone in the formation by maintaining the local equilibrium. The surfactant in the foam mixes with the hydrocarbonaceous fluids in lower permeability zone 18 and is produced from said zone via perforations 26 in producer well 12. These fluids are produced to the surface by conduit 16.

A method for removing oil from an overridden zone is disclosed by Dilgren et al. in U.S. Pat. No. 4,086,964 which issued on May 2, 1978. In this method steam along with foam was directed into the overridden zone to recover hydrocarbonaceous fluids. This patent is hereby incorporated by reference herein.

The organosilicone foam may be generated at the surface by co-injecting an organosilicone surfactant and a noncondensible gas into a static mixture. Noncondensible gases which can be used herein include helium, methane, carbon dioxide, flue gas, stack gas and mixtures thereof. Other gases which are noncondensible in character and which do not interact either with the formation matrix of the oil or other earth materials contained in the matrix can be utilized. As mentioned above, the foam can be generated in-situ as the fluids are co-injected.

In an exemplary preferred embodiment, given a net pay of 50 feet and steam injection conditions of 400° F. and 250 psi, 0.05 weight percent surfactant in the liquid phase is injected into a desired interval. The pH will be greater than about 7. The injected steam will have a steam quality of 50% and is injected into the interval at a rate of 600 barrels of steam per day (BSPD), cold water equivalent basis (CWEB). Nitrogen is injected into the interval at a rate of 36,000 standard cubic feet per day (SCFPD). As will be recognized by those skilled in the art, other organosilicone surfactants and different surfactant concentrations, injection rates, steam quality, and other noncondensible gases may be utilized. Also, steam injection rates may differ depending on the composition and type of silicon in the formation in addition to the economics of the process. Additionally, this method may be practiced with cyclic steam as well as in continuous steam-drive operations. Moreover, the surfactant may be injected as a slug or continuously.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for minimizing formation damage in a diatomaceous or silicon containing formation during a steam-flood comprising:
   injecting an organosilicone surfactant foam into an interval of said formation along with steam in an amount and for a time sufficient to cause a local equilibrium with the silicon containing formation thereby preventing dissolution of silicon from the formation so as to minimize caving near a wellbore and permeability reduction in the formation.

2. The method as recited in claim 1 where the steam-flood is utilized in a profile control or a mobility control method.

3. The method as recited in claim 1 where the surfactant in said foam is selected from a member of the group consisting of a nonionic silicone glycol copolymer, a siloxane-oxyalkylene copolymer, or a sulfo-derivative of organosilicone maleates.

4. The method as recited in claim 1 where the pH is greater than about 7 and the temperature about 400° F.

5. The method as recited in claim 1 where the surfactant in said foam is selected from a member of the group consisting of a nonionic silicone glycol copolymer, a siloxane-oxyalkylene copolymer, or a sulfo-derivative of organosilicone maleates and where a noncondensible gas utilized in said foam is selected from a member of the group consisting of helium, methane, carbon dioxide, flue gas, stack gas, and mixtures thereof.

6. The method as recited in claim 1 where the steam-flood is cyclic or continuous.

7. The method as recited in claim 1 where surfactant in said foam is injected as a slug.

8. The method as recited in claim 1 where surfactant in said foam is injected continuously.

9. The method as recited in claim 1 where said foam is generated at the surface.

10. The method as recited in claim 1 where said foam is generated in-situ.

11. The method as recited in claim 1 where foam and steam enter a zone of higher permeability in said formation thereby blocking off that zone to fluid flow and thereafter said foam and steam enter a lower permeability zone where hydrocarbonaceous fluids are subsequently produced to the surface.

12. The method as recited in claim 1 where a noncondensible gas utilized in said foam is selected from a member of the group consisting of helium, methane, carbon dioxide flue gas, stack gas, and mixtures thereof.

13. A method for minimizing formation damage in a diatomaceous or silicon containing formation during a steam-flood comprising:
   a) generating an organosilicone surfactant foam which surfactant is selected from a member of the group consisting of a nonionic silicone glycol copolymer, a siloxaneoxyalkylene copolymer, or a sulfo-derivative of organosilicone maleates and where a noncondensible gas utilized in said foam is selected from a member of the group consisting of helium, methane, carbon dioxide, flue gas, stack gas, and mixtures thereof; and
   b) injecting foam generated in step a) into an interval of said formation along with steam in an amount and for a time sufficient to cause a local equilibrium with the silicon containing formation thereby preventing dissolution of silicon from the formation so as to minimize caving near a wellbore and permeability reduction in the formation.

14. The method as recited in claim 13 where the steam-flood is utilized in a profile control or a mobility control method.

15. The method as recited in claim 13 where the pH is greater than about 7 and the temperature about 400° F.

16. The method as recited in claim 13 where the steam-flood is cyclic or continuous.

17. The method as recited in claim 13 where surfactant in said foam is injected as a slug.

18. The method as recited in claim 13 where surfactant in said foam is injected continuously.

19. The method as recited in claim 13 where said foam is generated at the surface.

20. The method as recited in claim 13 where said foam is generated in-situ.

21. The method as recited in claim 13 where foam and steam enter a zone of higher permeability in said formation thereby blocking of that zone to fluid flow and thereafter said foam and steam enter a lower permeability zone where hydrocarbonaceous fluids are subsequently produced to the surface.

* * * * *